Patented July 7, 1931

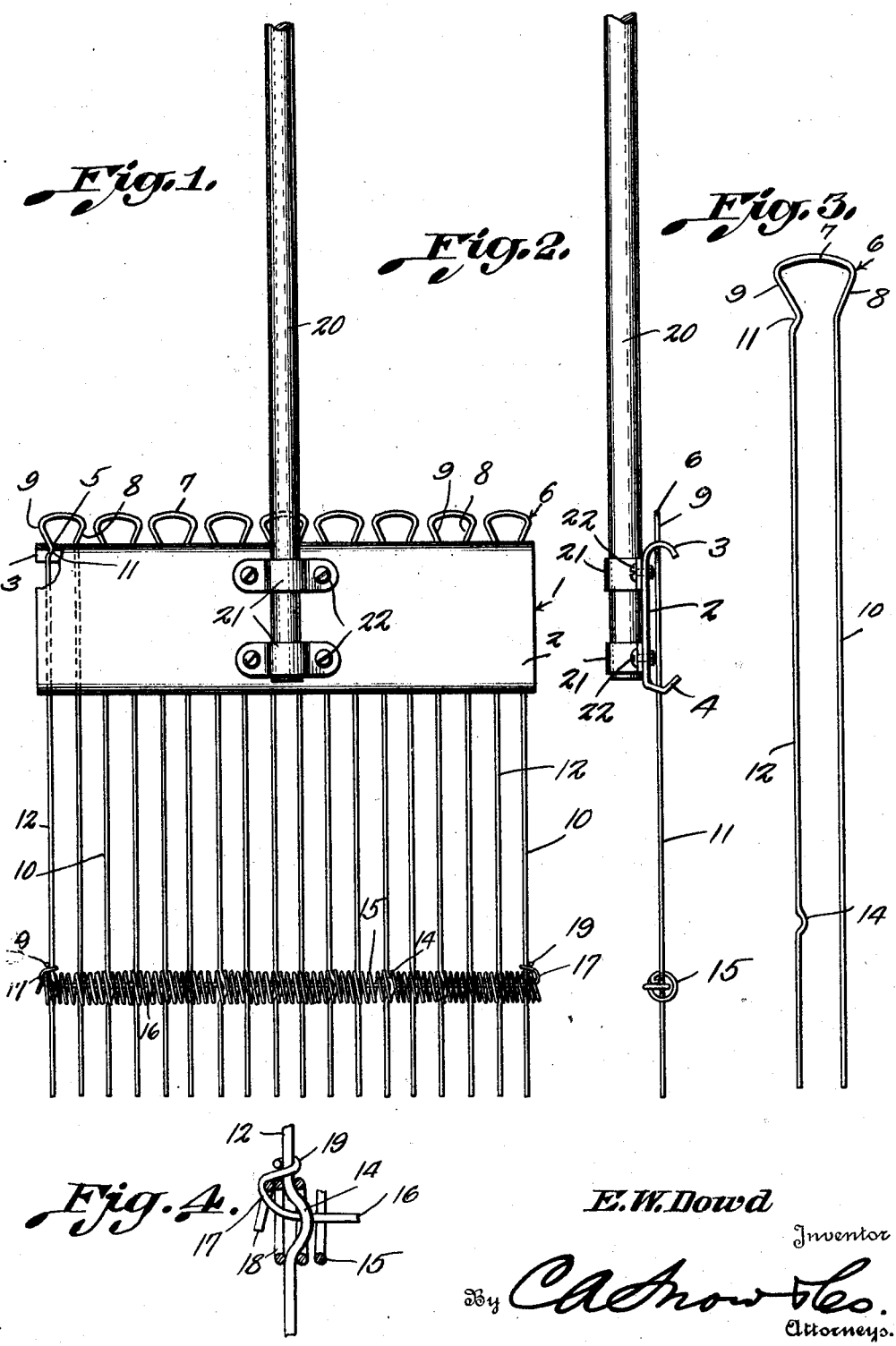

1,813,445

UNITED STATES PATENT OFFICE

ELMER W. DOWD, OF CHICAGO, ILLINOIS

WIRE BROOM OR RAKE

Application filed May 28, 1930. Serial No. 456,714.

This invention aims to provide a simple but effective broom or rake, novel means being provided for holding the tines of the rake in the cross piece which forms part of the head, and novel means being provided for joining the tines resiliently and yieldably, but firmly, independently of the cross piece.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:

Figure 1 shows in elevation, a device constructed in accordance with the invention, some parts being broken away;

Figure 2 is a side elevation;

Figure 3 is an elevation showing one of the tines;

Figure 4 is a sectional view illustrating the construction at the ends of the tie.

The head of the implement is marked by the numeral 1, and includes a cross piece 2 which may be a plate of rigid metal having an outwardly projecting first flange 3 and an outwardly projecting second flange 4, the flanges 3 and 4 having openings 5. The openings 5 of the flanges 3 and 4 are in alignment.

The head of the implement includes any desired number of U-shaped tines 6, made of resilient metal. Each of the tines has an enlargement including an end piece 7 and inwardly extended arms 8 and 9, the arm 9 merging into a prong 12, and the arm 8 merging into a prong 10. At the place where the arm 9 joins the prong 12 there is a depression or seat which forms a projection 14. The prongs 10 and 12 are located in the same plane with each other and in the same plane with the projection 14, the prongs being parallel.

The numeral 15 marks a coiled, cylindrical member, preferably a spring, through which the prongs 10 and 12 of the tines 6 project, the spring 15 being disposed approximately at right angles to the prong. The numeral 16 marks a tie, preferably made of wire mounted axially in the spring 15 and disposed across the prongs 10 and 12 of the tines 6. The tie 16 is extended at 17 around the outermost convolutions 18 of the spring 15, to bind the said convolutions against the outermost prongs 10—12, in a way which will be understood when Figures 1 and 2 are compared. The tie 16 ends in eyes 19 that engage around the said outermost prongs 12 and 10, above the spring 15, that is, between the spring 15 and the cross piece 2, and closely adjacent to the spring 15. The projections 14 extend within certain convolutions of the spring 15, and aid in keeping the spring centered with respect to the tie 16, the tie 16 and the spring 15 being resilient, giving the tines 6 reinforcement near to their free ends, without making the tines rigid.

A handle 20 may be of any desired construction and is shown as being held on the intermediate portion of the end piece 7 by a clamp 21 and securing element 22.

The device is of simple construction, but it affords a rake or broom well adapted to withstand hard use. The tines of the implement are reinforced, without being deprived of their resiliency, and a novel means is afforded, moreover, for holding the tines fixed in the cross piece 2. The tines 6 cannot slide downwardly in the cross piece 2, owing to the provision of the enlarged heads 9—7—8, and the engagement between the seat 11 and the flange 3 holds the tines against moving either upwardly or downwardly.

Having thus described the invention, what is claimed is:

1. An implement of the class described, comprising tines, a coiled spring through which the tines pass, the spring being disposed transversely of the tines, and a tie extended through the spring longitudinally thereof, the spring being connected at spaced points to certain of the tines.

2. An implement of the class described, comprising tines having laterally extended projections, a coil spring disposed transversely of the tines, the tines passing through the spring, the projections being engaged in certain of the convolutions of the springs, and means for securing the spring to certain of the tines.

3. An implement of the class described, comprising a plurality of tines, the tines having lateral projections, a coil spring disposed transversely of the tines, the tines passing through the spring, the projections being engaged in certain of the convolutions of the spring, and a tie extended lengthwise through the spring and connected to certain of the tines, the projections constituting means for holding the spring in spaced relation to the tie along the axis of the spring.

In testimony that I claim the foregoing as my own, I have hereto affixed my signature.

ELMER W. DOWD.